United States Patent
Feisel et al.

(10) Patent No.: US 8,173,079 B2
(45) Date of Patent: May 8, 2012

(54) METHOD FOR FORMING STRUCTURED POLYMERIC FILM

(75) Inventors: Bryan C. Feisel, Hudson, WI (US); Carsten Franke, St. Paul, MN (US); Brent R. Hansen, New Richmond, WI (US); David F. Slama, Grant, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/101,234

(22) Filed: May 5, 2011

(65) Prior Publication Data

US 2011/0210472 A1    Sep. 1, 2011

Related U.S. Application Data

(62) Division of application No. 11/813,438, filed as application No. PCT/US2006/001074 on Jan. 12, 2006, now Pat. No. 8,021,628.

(60) Provisional application No. 60/645,289, filed on Jan. 20, 2005.

(51) Int. Cl.
*G01N 33/00* (2006.01)
(52) U.S. Cl. ......... 422/502; 422/503; 422/560; 422/561
(58) Field of Classification Search .................. 422/502, 422/503, 560, 561
See application file for complete search history.

(56) References Cited

U.S. PATENT DOCUMENTS

| | | | |
|---|---|---|---|
| 3,399,101 A | 8/1968 | Magid | |
| 4,110,152 A | 8/1978 | Dunning | |
| 4,298,120 A | 11/1981 | Kaneko | |
| 4,712,675 A | 12/1987 | Scholten | |
| 4,724,958 A | 2/1988 | Kaneko | |
| 4,736,841 A | 4/1988 | Kaneko | |
| 5,125,508 A | 6/1992 | Yamamoto | |
| 5,472,085 A | 12/1995 | Gelzer | |

(Continued)

FOREIGN PATENT DOCUMENTS

EP    0 921 718 A2    6/1999

(Continued)

OTHER PUBLICATIONS

PCT/US2006/001074, International Filing Date, Jan. 12, 2006, PCT Written Opinion of the International Searching Authority.

*Primary Examiner* — Sam P Siefke
(74) *Attorney, Agent, or Firm* — Douglas B. Little

(57) ABSTRACT

A method for forming a structured polymeric film having a plurality of longitudinally spaced structured on both sides of the structured polymeric film is described. The method includes: providing a rotatable tool having an outer circumferential surface, the outer circumferential surface including a plurality of tool projections; providing a nip roll having a smooth conformable outer circumferential surface opposed to the outer circumferential surface of the tool; introducing a polymer layer into a nip between the tool and the nip roll; pressing the polymer layer between the tool and the nip roll to form web recesses into a first side of the polymer layer and web projections extending away from an opposing second side of the polymer layer, with the tool projections on the circumferential surface of the tool and form a structured web; and removing the structured web from the tool. Sample processing articles are also described.

7 Claims, 2 Drawing Sheets

U.S. PATENT DOCUMENTS

| | | |
|---|---|---|
| 5,496,502 A | 3/1996 | Thomson |
| 5,665,456 A | 9/1997 | Kannankeril |
| 5,738,816 A | 4/1998 | Tidemann |
| 5,765,692 A | 6/1998 | Schenz |
| 5,800,772 A | 9/1998 | Kurasawa |
| 6,168,026 B1 | 1/2001 | Haggard |
| 6,375,871 B1 | 4/2002 | Bentsen |
| 6,827,906 B1 | 12/2004 | Bjornson |
| 2002/0037386 A1 | 3/2002 | Bonke |
| 2002/0195372 A1 | 12/2002 | Troxtell, Jr. |
| 2005/0079101 A1 | 4/2005 | Dufresne |
| 2006/0293438 A1 | 12/2006 | de Souza |

FOREIGN PATENT DOCUMENTS

| | | |
|---|---|---|
| JP | 2004-091691 | 3/2004 |
| WO | WO 99/30334 | 6/1999 |
| WO | WO 02/00347 A2 | 1/2002 |
| WO | WO 02/01181 A2 | 1/2002 |
| WO | WO 2004/030896 A1 | 4/2004 |
| WO | WO 2004/080699 A2 | 9/2004 |
| WO | WO 2004/080700 A1 | 9/2004 |

METHOD FOR FORMING STRUCTURED POLYMERIC FILM

CROSS REFERENCE TO RELATED APPLICATIONS

This application is a divisional of U.S. application Ser. No. 11/813,438, filed Jul. 6, 2007, now U.S. Pat. No. 8,021,628, which is a national stage filing under 35 U.S.C. 371 of PCT/US2006/001074 filed Jan. 12, 2006, which claims priority to Provisional Patent Application No. 60/645,289, filed Jan. 20, 2005, the disclosures of which are incorporated by reference in their entirety herein.

BACKGROUND

The present disclosure relates generally to structured polymer films and methods for forming structured polymer films. More particularly, the disclosure relates to sample processing articles and methods for producing the sample processing articles.

A variety of devices or articles have been designed for the simultaneous processing of chemical, biochemical, and other reactions. The devices include a number of wells or process chambers in which the processing is performed. Detection of various analytes or process products may be performed by detecting signal light emitted from the process chambers. The signal light may be caused by, e.g., reactions within the process chambers. In other instances, the signal light may be in response to excitation by interrogating light directed into the process chamber from an external source (e.g., a laser, etc.), where the signal light results from, e.g., chemiluminescence, etc.

Regardless of the mechanism or technique used to cause the emission of signal light from the process chambers, its detection and correlation to specific process chambers may be required. If, for example, the signal light emitted from one process chamber is attributed to a different process chamber, erroneous test results may result. The phenomenon of signal light emitted from a first process chamber and transmitted to a second process chamber is commonly referred to as "cross-talk." Cross-talk can lead to erroneous results when, for example, the second process chamber would not emit any signal light alone, but the signal light transmitted to the second process chamber from the first process chamber is detected and recorded as a false positive result.

Attempts to avoid cross-talk have included increasing the distance between the process chambers such that any signal light reaching the second process chamber is too weak to register as a positive result with a detector. Other approaches include masking or shrouding the process chambers using an external device located over the process chambers such as is described in International Publication No. WO 02/01180 A2. One problem with these approaches is that process chamber density on a device may be limited, resulting in a less than desired number of tests being performed on a given sample processing device. Another potential problem with these approaches is that they require the use of articles or materials (e.g., masks, shrouds, etc.) in addition to the sample processing devices, thus increasing the cost and complexity of using the sample processing devices.

Another situation in which the issue of isolation between process chambers from cross-talk may arise in the delivery of interrogating light to the process chambers. For example, it may be desired that not all of the process chambers be interrogated at the same time. In other words, the process chambers may be interrogated serially (i.e., one at a time) or only selected groups of process chambers may be interrogated at the same time. In such a situation, it may be preferred that none or limited amounts of the interrogating light be transmitted to the process chambers that are not the subject of interrogation. With known processing devices, the control over interrogating light may require the use of masks or shrouds, thus raising the same problems of limited process chamber density, as well as the cost and complexity added by the additional articles/process steps.

Other problems associated with processing articles include control over the feature size, shape, and location. For example, it may be desired that variations in process chamber sizes, shapes, locations, etc., as well as the size, shape and location of other features in the devices (e.g., delivery conduits, loading chambers, etc.) be limited. Variations in feature size may detrimentally affect test accuracy by, e.g., changing the volume of analyte in the different process chambers. Further, variations in feature size may require additional sample volume to, e.g., ensure filling of all process chambers, etc. Variations in feature shape may, e.g., affect the signal light density emitted from a process chamber. Variations in feature location may, e.g., reduce test accuracy if process chamber location is not repeatable between different processing devices.

It is known to emboss polymer films using a rotating drum. The rotating drum can have a plurality of molds disposed around its circumference. The molds may be convex (i.e., male) or concave (i.e., female) molds, and are sized to provide the desired final embossed pocket dimensions, accounting for the thickness of the film, the depth of the pocket, and the thermal contraction of the film after molding or embossing. An exemplary method for producing processing articles using a rotary mold is described in U.S. 2005/0079101.

In the production of an embossed film using a convex rotary mold, a web of material is incrementally heated to its softening temperature, and is then guided to pass around the periphery of the drum. The softened material drapes over the molds and comes into close contact with generally the entire side surfaces of the convex molds except for those portions of the web located between adjacent convex molds. At the same time, the web is vacuum-drawn against the molds to urge the web into the spaces between adjacent molds. Rotary molds used in vacuum forming as described above are generally constructed by stacking a plurality of drum sections as described in U.S. Pat. No. 5,800,772. When a plurality of drum sections are assembled together, a forming tool is created. The space between the drum sections enables the use of vacuum to draw down a molten web to form pocket features.

For producing very small features in a polymer sheet, it is known to emboss a polymer web of material between a mold tool and a nip roll formed of steel or chrome. The thickness of the web exceeds the height of features on the tool, such that features are formed on the side of the web in contact with the tool features, and the backside of the web (in contact with the nip roll) is completely flat and featureless.

SUMMARY

Generally, the present disclosure relates to structured polymer films and methods for forming structured polymer films. More particularly, the disclosure relates to sample processing articles and methods for producing the sample processing articles.

A method for forming a structured polymeric film having a plurality of longitudinally spaced structured on both sides of the structured polymeric film is described. The method includes: providing a rotatable tool having an outer circumferential surface, the outer circumferential surface including a plurality of tool projections; providing a nip roll having a smooth conformable outer circumferential surface opposed to the outer circumferential surface of the tool; introducing a polymer layer into a nip between the tool and the nip roll; pressing the polymer layer between the tool and the nip roll to form web recesses into a first side of the polymer layer and web projections extending away from an opposing second side of the polymer layer, with the tool projections on the circumferential surface of the tool and form a structured web; and removing the structured web from the tool.

A sample processing article is also disclosed. The article includes a body having a light transmissive layer that transmits selected light and defines a body lower surface and a light control layer that blocks the selected light and defines a body upper surface and a plurality of sample processing chambers disposed within the body. The light control layer is attached to the light transmissive layer and the body has a body thickness. Each process chamber extends into the body upper surface and extends away from the body lower surface, and each sample processing chamber has a height being greater than the body thickness.

The above summary is not intended to describe each disclosed embodiment or every implementation of the present invention. The Figures, Detailed Description, and Examples that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
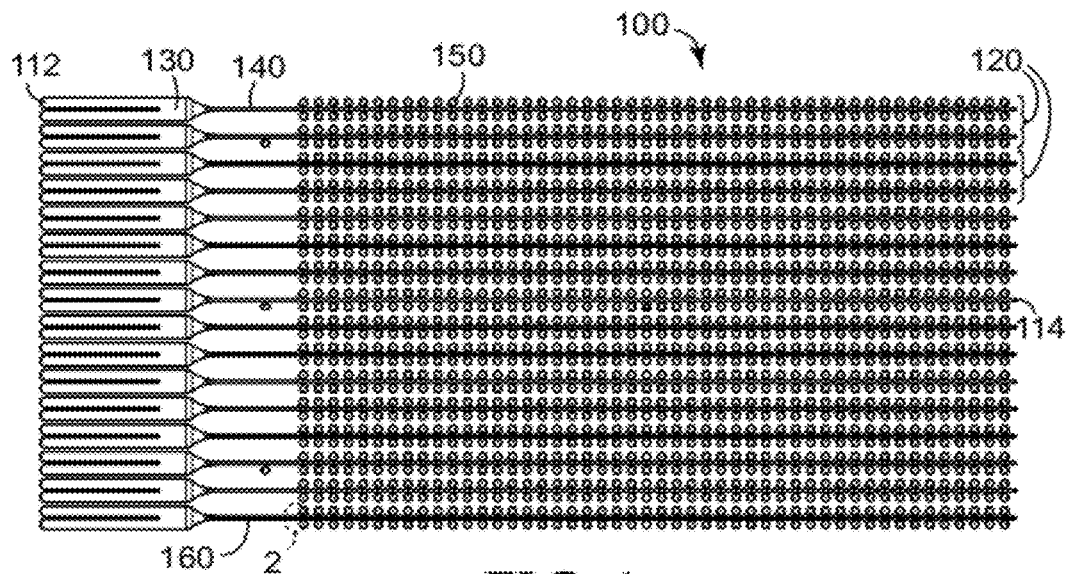
FIG. 1 is a schematic top view of an illustrative sample processing article.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

For the following defined terms, these definitions shall be applied, unless a different definition is given in the claims or elsewhere in this specification.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to an article containing "a layer" includes an article having two or more layers. As used in this specification and the appended claims, the term "or" is generally employed in its sense including "and/or" unless the content clearly dictates otherwise.

Unless otherwise indicated, all numbers expressing quantities of ingredients, measurement of properties and so forth used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

As used herein, the term "light" will be used to refer to electromagnetic energy, whether visible to the human eye or not. It may be preferred that the light fall within a range of ultraviolet to infrared electromagnetic energy, and, in some instances, it may be preferred that light include electromagnetic energy in the spectrum visible to the human eye.

The sample processing articles described herein include light transmissive layers and light control layers to reduce or eliminate cross-talk between process chambers in the processing article. The light transmissive layers preferably transmit significant portions of signal light and/or interrogation light while the light control layers block significant portions of signal light and/or interrogation light. For example, by blocking the transmission of signal light, cross-talk during emission of signal light can be reduced or eliminated. With respect to the delivery of interrogation light, blocking the transmission of interrogation light to selected process chambers can reduce or eliminate unwanted interrogation of the selected process chambers. In addition, the sample processing devices described herein are able to be formed of less material and still process a similar volume of sample material since the process chambers have a height that is greater than the thickness of the sample processing device body, as described below. These sample chambers have "backside" features that can be useful for aligning the sample processing devices.

These sample processing articles can be formed by a continuous forming process described herein. These methods produce sample processing articles that have both front-side and back-side features. These methods produce sample processing articles that have sample chambers that have a height that is greater than the thickness of the sample processing article body. Thus, these methods produce sample processing articles that can process the same amount of sample per article while using less material to produce the sample processing article. Furthermore, these methods provide for fast and economical manufacturing of processing articles including both transmissive layers and control layers. Further, the methods provide processing devices including features (e.g., process chambers, distribution conduits, etc.) that are accurately sized shaped and located.

The light control layers used in the sample processing devices and methods described herein are provided to block the transmission of selected light where the "selected light" may be light of one or more particular wavelengths, one or more ranges of wavelengths, one or more polarization states, or combinations thereof. As used in herein, "blocking" of light involves one or more of absorption, reflection, refraction, or diffusion of the selected light. In the case of signal light, transmission of the signal light through the light control layer is preferably prevented or reduced to levels that will not result in false positive readings from process chambers. In the case of interrogation light, transmission of the interrogation light through the light control layer is preferably prevented or reduced to levels that will not result in unwanted interrogation of process chambers. The light control layers may block light of selected wavelengths or ranges of wavelengths. The light control layers may also block light of one or more selected polarization states (e.g., s polarization, p polarization, circular polarization, etc), as desired. In many embodiments, the light control layer blocks at least 50% of selected light incident on the light control layer. In some embodiments, the light control layer blocks at least 75% of selected light incident on the light control layer.

In other embodiments, the light control layer blocks at least 90% of selected light incident on the light control layer.

The light transmissive layer transmits at least 50% of selected light incident on the light transmissive layer through the light transmissive layer. In many embodiments, the light transmissive layer transmits at least 75% of selected light incident on the light transmissive layer through the light transmissive layer. In some embodiments, the light transmissive layer transmits at least 90% of selected light incident on the light transmissive layer through the light transmissive layer.

The present disclosure provides a sample processing device that can be used in the processing of liquid sample materials (or sample materials entrained in a liquid) in multiple process chambers to obtain desired reactions, e.g., PCR amplification, ligase chain reaction (LCR), self-sustaining sequence replication, enzyme kinetic studies, homogeneous ligand binding assays, and other chemical, biochemical, or other reactions that may, e.g., require precise and/or rapid thermal variations. In many embodiments, the present disclosure provides sample processing devices that include one or more process arrays, each of which include a loading chamber, a plurality of process chambers and a main conduit placing the process chambers in fluid communication with the loading chamber. Although various constructions of illustrative embodiments are described below, sample processing devices of the present invention may be similar to those described in, e.g., US 2005/0079101, WO 02/01180 and WO 02/00347. The documents identified above all disclose a variety of different features that could be incorporated into sample processing devices described herein.

Figure 2:
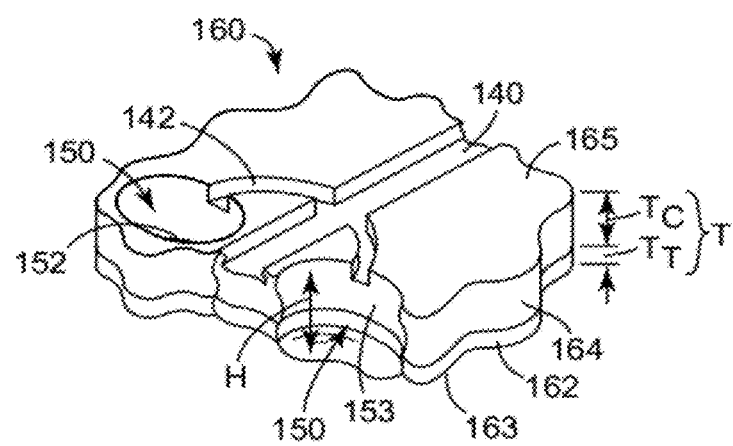
FIG. 2 is an enlarged fragmentary perspective view taken along 2-2 of FIG. 1 of the illustrative sample processing article showing the sample processing chambers.

FIG. 1 is a schematic top view of an illustrative sample processing article 100 and FIG. 2 is an enlarged fragmentary perspective view taken along 2-2 of FIG. 1 of the illustrative sample processing article 100 showing the sample processing chambers 150 in greater detail. The sample processing article 100 includes at least one or more process arrays 120. Each of the depicted process arrays 120 can extends from proximate a first end 112 towards the second end 114 of the sample processing device 100. The process arrays 120 are depicted as being substantially parallel in their arrangement on the sample processing device 100, although other arrangements are possible.

Alignment of the process arrays 120 as depicted may be useful if the main conduits 140 of the process arrays are to be closed simultaneously as discussed in, e.g., International Publication No. WO 02/01180. Alignment of the process arrays 120 may also be useful if sample materials are to be distributed throughout the sample processing device by rotation about an axis of rotation proximate the first end 112 of the device 100 as discussed in, e.g., International Publication No. WO 02/01180.

Each of the process arrays 120 in the depicted embodiment includes at least one main conduit 140, and a plurality of process chambers 150 located along each main conduit 140. The process arrays 120 may also include a loading structure 130 in fluid communication with a main conduit 140 to facilitate delivery of sample material to the process chambers 150 through the main conduit 140. In some embodiments, each of the process arrays 120 include only one loading structure 130 and only one main conduit 140.

The loading structure 130 may be designed to mate with an external apparatus (e.g., a pipette, hollow syringe, or other fluid delivery apparatus) to receive the sample material. The loading structure 130 itself may define a volume or it may define no specific volume, but, instead, be a location at which sample material is to be introduced. For example, the loading structure 130 may be provided in the form of a port through which a pipette or needle is to be inserted. In one embodiment, the loading structure 130 may be, e.g., a designated location along the main conduit that is adapted to receive a pipette, syringe needle, etc. The loading may be performed manually or by an automated system (e.g., robotic, etc.). Further, the processing device 100 may be loaded directly from another device (using an automated system or manually).

The loading chamber 130 depicted in FIG. 1 is only one embodiment of a loading structure 130 in fluid communication with the main conduit 140. In many embodiments, the loading chamber volume, i.e., the volume defined by the loading chamber (if so provided), be equal to or greater than the combined volume of the main conduit 140, process chambers 150, and feeder conduits 142 (if any).

The process chambers 150 are in fluid communication with the main conduit 140 through feeder conduits 142. As a result, the loading structure 130 in each of the process arrays 120 is in fluid communication with each of the process chambers 150 located along the main conduit 140 leading to the loading structure 130. If desired, each of the process arrays 120 may also include an optional drain chamber (not shown) located at the end of the main conduit 140 opposite the loading structure 130.

As illustrated in FIG. 2, the sample processing article 100 includes a body 160 having a light transmissive layer 162 that transmits selected light and defines a body lower surface 163 and a light control layer 164 that blocks the selected light and defines a body upper surface 165. The light control layer 164 is attached to the light transmissive layer 162 and the body 160 has a body thickness T. A plurality of sample processing chambers 150 are disposed within the body 160. Each process chamber 150 extends into the body upper surface 165 and extends away from the body lower surface 163, and each sample processing chamber 150 has a height H that is greater than the body thickness T.

In some embodiments, the body thickness T is in a range from 100 to 500 micrometers and the height is in a range from 10 to 100 micrometers greater than the body thickness T. In other embodiments, the body thickness T is in a range from 200 to 300 micrometers and the height H is in a range from 25 to 50 micrometers greater than the body thickness T.

Each processing chamber 150 can have a volume in a range from 0.05 to 5 microliters. In some embodiments, each processing chamber 150 can have a volume in a range from 0.1 to 1 microliter.

Each processing chamber 150 is defined by light control layer sidewalls 153 and a light transmissive bottom surface 152. In many embodiments, the light transmissive layer 162 has a first thickness $T_T$ and the light control layer 164 has a second thickness $T_C$ and the second thickness $T_C$ is greater than the first thickness $T_T$. In some embodiments, the first thickness $T_T$ is in a range from 25 to 150 micrometers and the second thickness $T_C$ is in a range from 75 to 350 micrometers.

The light transmissive layer 162 can be constructed of one or more materials such that the light transmissive layer 162 transmits significant portions of selected light. Significant portions is, e.g., 50% or more of normal incident selected light, or 75% or more of normal incident selected light, or 90% or more of normal incident selected light. As discussed above, the selected light may be light of one or more particular wavelengths, one or more ranges of wavelengths, one or more polarization states, or combinations thereof. Examples of some suitable materials for the light transmissive layer 162 include, but are not limited to, e.g., polypropylenes, polyesters, polycarbonates, polyethylenes, polypropylene-polyethylene copolymers, cyclo-olefin polymers (e.g., polydicyclopentadiene), etc.

The light control layer 164 can be constructed of one or more materials such that the light control layer 164 blocks significant portions of selected light. Significant portions of blocked light, e.g., 50% or more of normal incident selected light, or 75% or more of normal incident selected light, or 90% or more of normal incident selected light. As discussed above, the selected light may be one or more particular wavelengths, one or more ranges of wavelengths, one or more polarization states, or combinations thereof. Examples of some suitable materials for the control layer 164 include, but are not limited to, e.g., polypropylenes, polyesters, polycarbonates, polyethylenes, polypropylene-polyethylene copolymers, cyclo-olefin polymers (e.g., polydicyclopentadiene), etc., that have been modified to provide the desired light blocking function. For example, the material used for the light control layer 164 may include a light blocking filler (e.g., colorants, carbon black, metallic particles, etc.) to prevent or reduce transmission of selected light through the light control layer 164. In other embodiments, the light control layer 164 includes a coating or other treatment that provides the desired light blocking function.

Where a melt bond between light transmissive layer 162 and light control layer 164 is to be formed, the light transmissive layer 162 and the light control layer 164 can be formed of compatible materials, in some instances, the light transmissive layer 162 and the light control layer 164 is formed of the same polymeric material.

Figure 3:
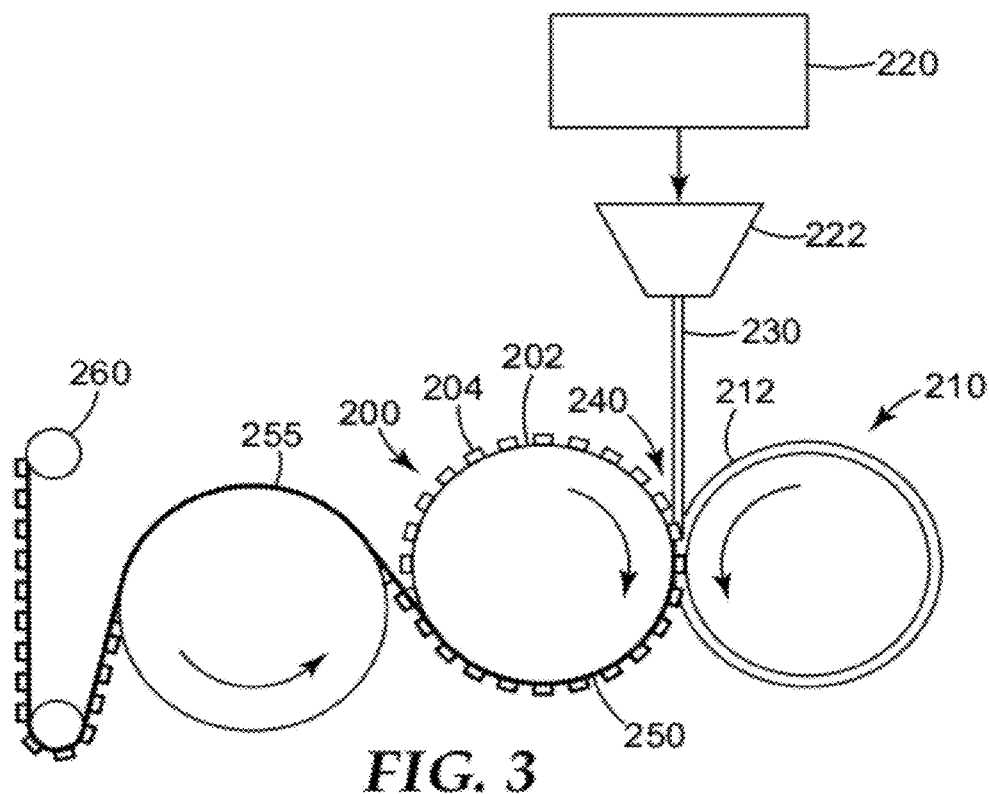
FIG. 3 is a schematic illustration of an exemplary process for producing structured polymeric film having a plurality of longitudinally spaced structures on both sides of the structured polymeric film.

FIG. 3 is a schematic illustration of an exemplary process for producing structured polymeric film having a plurality of longitudinally spaced structures on both sides of the structured polymeric film. A nip roll 210 having a conformable outer circumferential surface 212 is in contact with and opposes an outer circumferential surface 202 of the rotatable tool 200. The outer circumferential surface 202 includes a plurality of tool projections 204 disposed around the outer circumferential surface 202. The projections 204 press into and deform the surface 212 of the nip roll 210. In many embodiments, the circumferential surface 212 of the nip roll 210 is covered with an elastomeric material. Suitable elastomeric materials include, but are not limited to, rubbers, silicones, ethylene propylene diene monomers (EPDM), urethanes, Teflon®, nitriles, neoprenes, and fluoroelastomers. In some embodiments, the conformable outer surface 212 of the nip roll 210 has a Shore A hardness in the range of 30 to 100, or in the range of 40 to 90, or in a range from 50 to 85, depending upon the material being formed.

A melt-processable polymer is delivered from an extruder 220 to a slot die apparatus 222. The melt-processable polymer is delivered to the slot die apparatus 222 at or above its melting temperature (i.e., the temperature at which it can be formed or molded). A web 230 of polymer is discharged from the die apparatus 222 into the nip 240 between the rotatable tool 200 and the nip roll 210. In some embodiments, the polymer web 230 is drop cast onto the rotatable tool 200 just before the nip 240 formed with the nip roll 210. The conformable outer surface 212 of the nip roll 210 deforms as the polymer web 230 is pressed between the rotatable tool 200 and the nip roll 210 and formed with the features of the rotatable tool 200 into a frontside of the web 230. The pressure applied to the web 230 by the conformable nip roll 210 is sufficient to force molten resin of web 230 into small crevices between the tool projections 204 (forming features of the sample processing article 100 such as processing chambers 150) of the rotatable tool 200, and to provided backside feature definition to the web 230 (i.e., features are defined on bottom surface 163 of the body 160). Thus, the frontside of the web 230 has a plurality of "holes" or "voids" formed therein and the backside of the web 230 has a non-planar topography, both formed by the tool projections 204 on the rotatable tool 200. The pressure applied by the conformable nip roll 210 will depend upon a plurality of factors, including process speed, material viscosity, web thickness, and dimensions and spacing of tool projections 204 on rotatable tool 200.

The dimensions of the incoming polymeric web 230 will be determined by the gauge and width of the sample processing device 100 that is to be formed. The thickness of the polymer web 230 and the pressure between the rotatable tool 200 and the nip roll 210 can be controlled such that the thickness T of the web 230 exiting the nip 240 is less than the height of the tool projections 204 that form the web projections 150 of the sample processing article 100. In some embodiments, the polymer web 230 is delivered to the nip 240 at a thickness in the range of 5 mils to 20 mils.

In some embodiments, the polymer web 230 is delivered from the die apparatus 222 to the rotatable tool 200 at a temperature that is at or above its melt processing temperature. By providing the polymer web 230 to the rotatable tool 200 at or above its melt processing temperature, the polymer can adequately form or be replicated to the shape of the tool projections 204. The temperature at which the polymeric web 230 must be delivered from the die apparatus 222 varies over a broad range (i.e., about 100° to over 330° centigrade) depending upon the gauge and type of material that is being formed, as well as the speed of the manufacturing line. Although the tool 200 is depicted and described herein as a roll, it should be understood that the tool 200 may alternatively be provided as any other rotatable structure amenable to continuous web-form processing, such as a continuous belt.

In some embodiments, the temperature of the polymer web is lowered to below the melt processing temperature at some point after the nip 240 between the rotatable tool 200 and the nip roll 210 to retain the structures formed in the polymer web 230 and provide mechanical stability to the web. In an exemplary implementation of FIG. 3, the structured or replicated web 250 passes over a chiller roller 255 immediately after coming off the tool 200 and before being wound on a take-up real 260. To aid in temperature control of the web 230, the rotatable tool 200 and/or the nip roll 210 may be heated or cooled, as necessary. The result of the processing depicted in FIG. 3 is a structured or replicated web 250 that can be divided into individual sample processing articles 100, as desired.

In the case of extrusion of thermoplastic resins, a web of molten material is guided to pass through the nip 240. As the structured web 250 exits the nip 240, any suitable cooling means may be employed to cool the web and sufficiently harden the material such that it may be removed from the rotatable tool 200. Cooling can be accomplished, for example, by convective air cooling, direct impingement of air jets by high-pressure blowers, a water bath or spray, or a cooling oven until the thermoplastic polymer sufficiently solidifies.

In the case of polymerizable resins, the resin may be poured or pumped directly into a dispenser that feeds the slot die apparatus 222. For embodiments wherein the polymer resin is a reactive resin, the method of manufacturing the web further includes curing the resin in one or more steps. For example, the resin may be cured upon exposure to a suitable radiant energy source such an actinic radiation, ultraviolet light, visible light, etc., depending upon the nature of the polymerizable resin to sufficiently harden the resin prior to removal from the rotatable tool 200. Combinations of cooling and curing may also be employed in hardening the web as it comes off the tool 200.

The rotatable tool 200 may be comprised of any substrate suitable for forming by direct machining. Suitable substrates machine cleanly with minimal or no burr formation, exhibit low ductility and low graininess, and maintain dimensional accuracy after machining. A variety of machinable metals or plastics may be utilized. Suitable metals include aluminum, steel, brass, copper electroless nickel, and alloys thereof. Suitable plastics comprise thermoplastic or thermoset materials such as acrylics or other materials. In some embodiments, the material forming rotatable tool 200 may comprise a porous material, such that a vacuum can be applied through the material of rotatable tool 200, in combination with nip roll 210.

The rotatable tool 200 can be formed as a unitary sleeve having tool projections 204 for all of the desired sample processing article 100 features on the unitary sleeve. The sleeve may include projections for forming the pockets, alignment features thereof, and protuberances for skiving to form sprocket holes, for example. The method includes simultaneously thermoforming the pockets and the protuberances to provide excellent registration therebetween.

Tool projections 204 on the outer circumference 202 of the rotatable tool 200 can be cut directly onto the sleeve using either a carbide or diamond tooling machine that is capable of shaping each projection with fine precision. Moore Special Tool Company, Bridgeport, Conn.; Precitech, Keen, N.H.; and Aerotech Inc., Pittsburgh Pa., manufacture suitable machines for such purposes. Such machines typically include a laser interferometer-positioning device, a suitable example of which is available from Zygo Corporation, Middlefield Conn. The diamond tools suitable for use are those such as can be purchased from K&Y Diamond, Mooers, N.Y., or Chardon Tool, Chardon, Ohio.

The sleeve can be machined using techniques and methods known in the art to form the desired tool projections 204 thereon. For example, the projection surfaces corresponding to the processing chambers 150 can be formed by turning the sleeve in a typical lathe operation in which the sleeve is turned and the cutter is in a fixed position or can be formed by holding the sleeve stationary and cutting slots parallel to the axis of the sleeve. Additional projections, such as those for forming posts for skiving, can be formed in a manner similar to the formation of the projections used to shape the processing chambers. Beneficially, tool projections 204 on the sleeve can be formed to simultaneously produce a plurality of sample processing articles 100.

Figure 4:
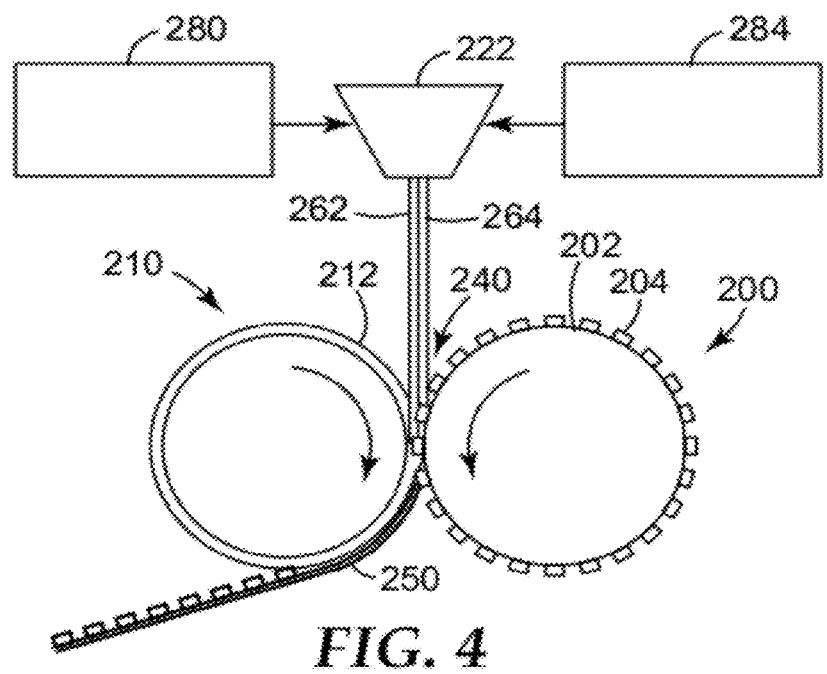
FIG. 4 is a schematic illustration of an exemplary process for producing structured polymeric multilayer film having a plurality of longitudinally spaced structures on both sides of the structured polymeric film.

FIG. 4 is a schematic illustration of an exemplary process for producing structured polymeric multilayer film having a plurality of longitudinally spaced structures on both sides of the structured polymeric film. This process operates as described in FIG. 3 above, however, this process utilizes a polymer web having a light control layer 264 and a light transmissive layer 262.

As described above, a melt-processable polymer for the light transmissive layer 262 is delivered from a first extruder 280 to a multi-layer feedblock and film die 282. At the same time, a melt-processable polymer for the light control layer 264 is delivered from a second extruder 284 to the multi-layer feedblock and film die 282. In many embodiments, the two melt-processable polymers streams are delivered to the multi-layer feedblock and film die 282 at or above their melt-processing temperature. The multi-layer feedblock and film die 282 keeps the two polymer melt streams from extruders 280 and 284 separated such that the two polymers form separate and discrete layers 262 and 264.

The layers 262 and 264 of polymer are discharged from the multi-layer feedblock and film die 282 onto a rotatable forming tool 200. In many embodiments, the polymer layers 262 and 264 are drop cast onto a surface 202 of the rotatable forming tool 200 at a point near the nip 240 between rotatable forming tool 200 and a conformable nip roll 210.

The nip roll 210 has a conformable outer circumferential surface 212 is in contact with and opposes the outer circumferential surface 202 of the rotatable tool 200. The outer circumferential surface 202 includes a plurality of tool projections 204 disposed around the outer circumferential surface 202. The projections 204 press into and deform the surface 212 of the nip roll 210. In many embodiments, the circumferential surface 212 of the nip roll 210 is covered with an elastomeric material. Suitable elastomeric materials include, but are not limited to, rubbers, silicones, ethylene propylene diene monomers (EPDM), urethanes, Teflon®, nitriles, neoprenes, and fluoroelastomers. In some embodiments, the conformable outer surface 212 of the nip roll 210 has a Shore A hardness in the range of 30 to 100, or in the range of 40 to 90, or in a range from 50 to 85, depending upon the material being formed.

The thickness of each of layers 262 and 264 can be controlled such that the total thickness of both layers 264 and 262 is less than the height of the tool protrusions 204 that form the process chamber structures 150 in the processing devices 100, described above.

The light control layer 264 be delivered to the nip 240 at a temperature that is at or above its melt processing temperature (i.e., the temperature at which it can be formed or molded). By providing the light control layer 264 at or above its melt processing temperature, the polymer in the light control layer can adequately form or be replicated to the shape of the tool protrusions 204. Although the forming tool 200 is depicted as a roll, it should be understood that it may alternatively be provided as a continuous belt or other structure amenable to continuous web-form processing.

The polymer of the light transmissive layer 262 can also be delivered to the nip 240 at a temperature that is at or above its melt processing temperature such that the two layers 262 and 264 can be formed together to provide a melt bond between the two layers while the features of forming tool 200 are being formed into the light control layer 264 and extend from the light transmissive layer 262, as described in FIG. 1 and FIG. 2 above.

The temperatures of both layers 262 and 264 can be lowered to below their respective melt processing temperatures at some point after the nip 240 to retain the structures formed in both layers 264 and 262 and provide mechanical stability to the web. The result of the processing depicted in FIG. 4 is a structured web 250 including both a light transmissive layer 262 and a light control layer 264 to form the body 160 of a processing device 100, as described in FIG. 1 and FIG. 2 above.

EXAMPLES

Example 1

A multilayer sample processing device was produced from a two layer coextruded web using conventional extrusion apparatus. Two extruders were used to produce a two layer structure consisting of a clear light transmissive layer and a black opaque light control layer. The clear layer was produced with a polypropylene homopolymer (3576, 9.0 MFI, Atofina Inc., Houston, Tex.). The black layer was produced with 98% 3576 polypropylene and 2% carbon black/polypropylene concentrate (Product# 3900, 40% carbon black, PolyOne Corp., Avon Lake, Ohio). A 6.35 cm single screw extruder (15 RPM) was used to supply 3576 polypropylene for the clear layer and a 3.2 cm single screw extruder (80 RPM) was used to supply 3576 and black concentrate for the black layer. The barrel temperature profiles of the two extruders were approximately the same starting from a feed zone of 193° C. and the remaining two zones at 204° C. The flow rates of the extruders were adjusted to maintain an approximate 3:2 weight ratio between the clear and black layers respectively. The melt streams of the two extruders were fed to an ABC three layer coextrusion feedblock (Cloeren Co., Orange, Tex.) with the 'C' port being closed. The feedblock was mounted onto a conventional 25 cm coat hanger die. The feedblock and die were maintained at 204° C. The melt temperature measured at the die was 216° C.

The two layer extrudate was delivered vertically downward into a nip formed by a forming tool roll and a conformable rubber roll in such a manner that the black layer was in contact with the forming roll and the clear layer was in contact with the rubber roll. The forming tool roll was comprised of a 1.6 mm thick nickel sleeve fitted onto a 30.5 cm diameter aluminum HYDRALOCK expandable roll. The sleeve was produced by an electroforming process and consisted of a series of patterns similar to that shown in FIG. 1, distributed around the sleeve. The patterns consisted of protuberances and recesses to produce three dimensional features on both sides of the extrudate. The conformable rubber roll was comprised of a 9.5 mm thick silicone rubber (ARCOSIL, 60 Shore 'A' hardness, American Roller Co., Union Grove, Wis.) sleeve fitted onto a 30.5 cm diameter steel roll. The temperature of the forming tool roll was maintained at 63° C. and the temperature of the rubber roll was maintained at 10° C. The pressure between the tool roll and rubber roll was approximately 2.8 kg/cm² (cylinder gauge). The extrudate was drawn into and formed in the nip at a linespeed of 2.1 meters/minute resulting in a structured article similar to that shown schematically in FIG. 2. The protuberances (0.8 mm in height, 1.2 mm in diameter) of the tool roll pressed into the black layer and resulted in the majority of the black layer being displaced away from the tip of the tool roll protuberances such that the clear layer was exposed resulting in recesses having opaque side walls and a relatively transparent bottom surface. Replication of the tool roll features was excellent, resulting in recesses in the structured article of approximately 0.8 mm in height, 1.2 mm in diameter and 0.9 microliters in volume. The recesses were interconnected via a main conduit 140 (0.4 mm in width, 0.15 mm in height) and side channels 142 (0.25 mm in width, 0.12 mm in height) that were replicated via ridges interconnecting the pins on the tool roll. The relatively transparent bottom surface projected away from the backside clear layer plane resulting in a backside having a "bumpy" topography.

Example 2

A sample processing device was produced as in Example 1 above except both extruders were fed with the carbon black filled polypropylene mixture. The melt streams of the two extruders were combined in the feedblock and then fed to the die as a single layer. The same rolls and conditions were used as in Example 1 resulting in a black three dimensional structured film having recesses of approximately 0.8 mm in height, 1.2 mm in diameter and 0.9 microliters in volume. It is also contemplated that a single extruder could have been used to feed a single layer to produce a similar single layer article.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the art will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method for forming a structured polymeric film having a plurality of longitudinally spaced structures on both sides of the structured polymeric film, comprising:
    providing a rotatable tool having an outer circumferential surface, the outer circumferential surface including a plurality of tool projections;
    providing a nip roll having a smooth conformable outer circumferential surface opposed to the outer circumferential surface of the tool, the nip roll having a conformable outer circumferential surface of a Shore A hardness in the range of 30 to 100;
    introducing a transparent polymer layer and an opaque polymer layer into a nip between the tool and the nip roll;
    pressing the polymer layers between the tool and the nip roll to form web recesses into a first side of the opaque polymer layer and web projections extending away from an opposing second side of the transparent polymer layer, with the tool projections on the circumferential surface of the tool and forming a structured web, the tool projections having a height greater than the total thickness of both polymer layers; and
    removing the structured web from the tool;
    said transparent polymer layer being further from the tool projections in the nip than the opaque polymer layer, whereby the resulting structured web has recesses having opaque side walls and transparent bottom surfaces.

2. A method according to claim 1 wherein the providing a nip roll step comprises providing a nip roll having a conformable outer circumferential surface of a Shore A hardness in a range from 40 to 90.

3. A method according to claim 1 wherein the providing a nip roll step comprises providing a nip roll having a conformable outer circumferential surface of a Shore A hardness in a range from 50 to 85.

4. A method according to claim 1 wherein the introducing step comprises introducing a molten polymer layer into a nip between the tool and the nip roll.

5. A method according to claim 1 wherein the introducing step comprises introducing a molten first polymer layer and molten second polymer layer into a nip between the tool and the nip roll.

6. A method according to claim 1 wherein the introducing step comprises coextruding a first polymer layer and second polymer layer into a nip between the tool and the nip roll.

7. A method according to claim 1 wherein the structured web is divided into a plurality of sample processing articles.

* * * * *